(12) United States Patent
Hahn

(10) Patent No.: US 6,318,202 B1
(45) Date of Patent: Nov. 20, 2001

(54) TRANSMISSION FOR DRIVING THE SCREWS OF A TWIN-SCREW EXTRUDER

(75) Inventor: Karl Hahn, Ennsdorf (AT)

(73) Assignee: E. Eisenbeiss Söhne Maschinen- und Präzisionszahnräderfabrik GmbH, Linz (AT)

( * ) Notice: Subject to any disclaimer, the term of this patent is extended or adjusted under 35 U.S.C. 154(b) by 0 days.

(21) Appl. No.: 09/410,621

(22) Filed: Oct. 1, 1999

(30) Foreign Application Priority Data

Oct. 9, 1998 (AT) .................................................. 1690/98

(51) Int. Cl.⁷ ...................................................... F16H 1/18
(52) U.S. Cl. ......................................... 74/424.7; 74/66 SG
(58) Field of Search ........................ 74/665 GA, 410, 74/665 N

(56) References Cited

U.S. PATENT DOCUMENTS

| | | | |
|---|---|---|---|
| 3,824,875 | * 7/1974 | Willert et al. | 74/665 GA |
| 3,965,612 | 6/1976 | Asano | 46/211 |
| 4,135,328 | 1/1979 | Yamasaki | 46/202 |
| 4,197,672 | 4/1980 | Mabuchi et al. | 46/254 |
| 4,329,886 | 5/1982 | Branstner | 74/416 |
| 4,475,618 | 10/1984 | Kennedy et al. | 180/237 |
| 4,485,587 | 12/1984 | Barlow et al. | 446/442 |
| 4,545,451 | 10/1985 | Pipa et al. | 180/70.1 |
| 4,577,528 | 3/1986 | Hanzawa | 74/665 |
| 4,648,853 | 3/1987 | Siegfried | 446/448 |
| 4,682,510 | 7/1987 | DeBernardi | 74/665 |
| 4,763,538 | 8/1988 | Fujita et al. | 74/6 |
| 4,878,877 | 11/1989 | Auer et al. | 446/463 |
| 4,899,620 | * 2/1990 | Schiffer | 74/665 N |
| 5,090,030 | 2/1992 | Jenkins | 377/5 |
| 5,100,368 | 3/1992 | Chien | 475/149 |
| 5,103,689 | * 4/1992 | Dollhopf | 74/665 GA |
| 5,104,361 | 4/1992 | Jenkins | 475/184 |
| 5,281,184 | 1/1994 | Suimon | 446/460 |
| 5,362,283 | 11/1994 | Jenkins | 475/184 |
| 5,453,035 | 9/1995 | Jenkins | 446/163 |
| 5,492,024 | 2/1996 | Siner | 74/89 |
| 5,762,532 | 6/1998 | Ishizuka et al. | 446/457 |
| 5,762,533 | 6/1998 | Tilbor et al. | 446/466 |

FOREIGN PATENT DOCUMENTS

| | | |
|---|---|---|
| 351 235 | 12/1978 | (AT) . |
| 398 938 | 7/1994 | (AT) . |
| 4305133 | * 2/1993 | (DE) . |
| 4313079 | * 4/1993 | (DE) . |

* cited by examiner

*Primary Examiner*—Sherry Estremsky
*Assistant Examiner*—Tisha D. Lewis
(74) *Attorney, Agent, or Firm*—Collard & Roe, P.C.

(57) ABSTRACT

A transmission for driving the screws of a twin-screw extruder comprises two parallel output shafts (1, 2) of different lengths and rotating in opposite directions, the shorter one of which carries a drive gear (4) meshing with one gearwheel (6) each of two distributor shafts (7), which from the side of the longer output shaft (1) can be driven by an intermediate shaft (10) via gearwheels (11). To create advantageous constructional conditions it is proposed that on the longer output shaft (1) a gearwheel (5) meshing with the drive gear (4) of the shorter output shaft (2) is affixted.

3 Claims, 1 Drawing Sheet

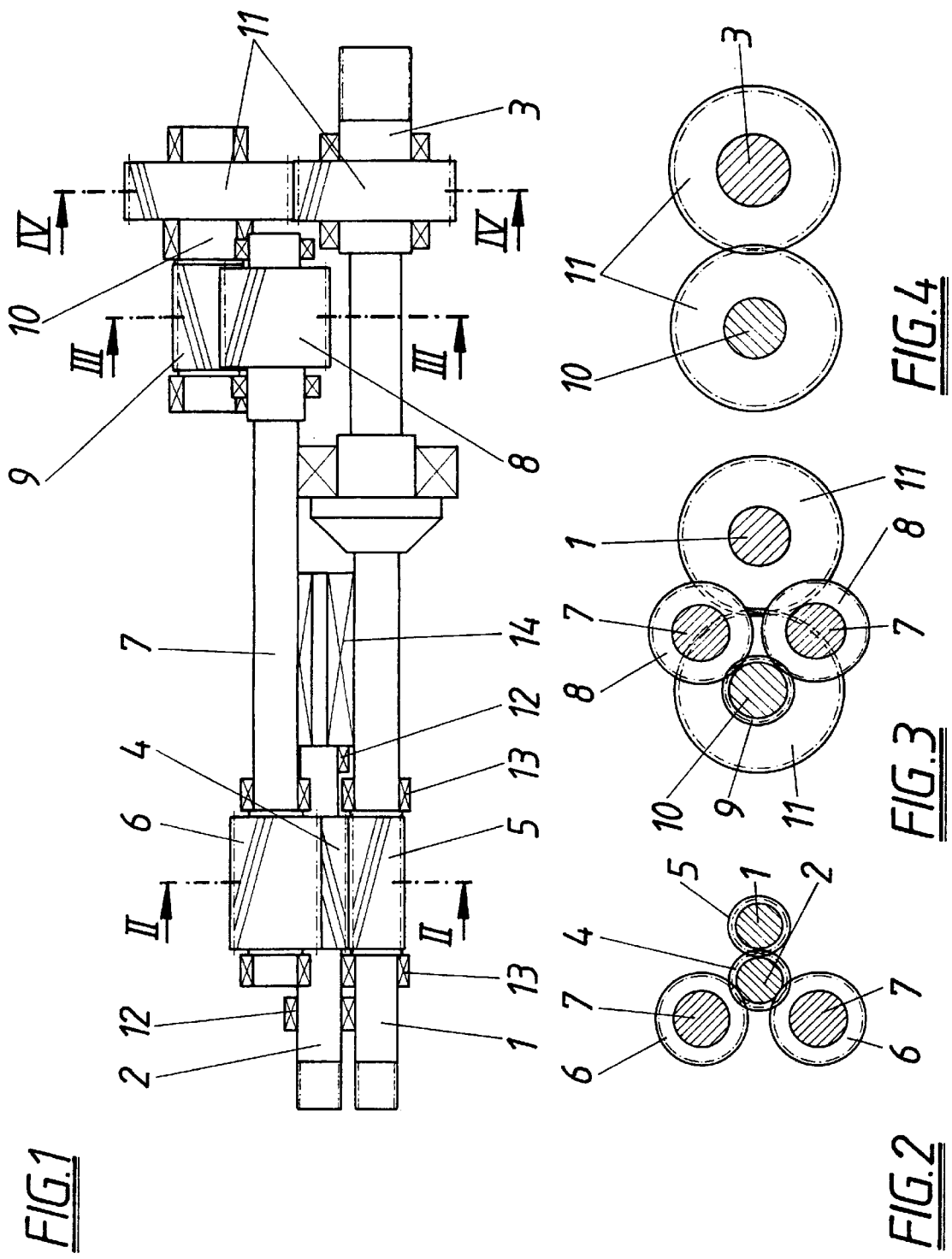

TRANSMISSION FOR DRIVING THE SCREWS OF A TWIN-SCREW EXTRUDER

FIELD OF THE INVENTION

This invention relates to a transmission for driving the screws of a twin-screw extruder comprising two parallel output shafts of different lengths and rotating in opposite directions, the shorter one of which carries a drive gear meshing with one gearwheel each of two distributor shafts, which from the side of the longer output shaft can be driven by an intermediate shaft via gearwheels.

DESCRIPTION OF THE PRIOR ART

To be able to transmit the high torques for driving the screw shafts of a twin-screw extruder despite the predetermined comparatively small distance between the screw shafts, it is known U.S. Pat. No. 4,899,670 to use a transmission having two output shafts of different lengths, the shorter one of which carries a drive gear meshing with a gearwheel of the longer output shaft. In addition, the drive gear of the shorter output shaft is in engagement with a gearwheel of a parallel intermediate shaft, which from the side of the drive shaft is driven together with the longer output shaft. Since the drive gear of the shorter output shaft is thus driven via two gearwheels, only half the torque need be transmitted via these gearwheels to the shorter output shaft, which results in correspondingly smaller meshing forces. Moreover, since the drive gear of the shorter output shaft and the two gearwheels meshing with this drive gear are arranged in a common axial plane, the bending loads of the shorter output shaft remain small, which has an advantageous effect on the tandem bearing of the shorter output shaft, which is very sensitive to inclined positions. What is, however, disadvantageous in this known transmission is the fact that via the longer output shaft not only the torque for the attached screw shaft, but also half the torque for the shorter output shaft must be transmitted, i.e. a torque which corresponds to three quarters the entire torque to be applied, when the two screw shafts of the extruder should be driven with the same torque. The resulting larger diameter of the longer output shaft reduces the already limited distance between the two output shafts, which results in a design-related limitation of the transmittable torques, because the tandem bearing to be dimensioned sufficiently for the shorter output shaft must find room between the two output shafts.

To ensure that the longer output shaft merely has to transmit the torque required for the attached screw shaft, it is also known (AT 351,235 B) to drive the drive gear of the shorter output shaft not via a gearwheel on the longer output shaft, but only via two distributor shafts, which are meshing with the drive gear of the shorter output shaft via one gearwheel each. The drive of these two distributor shafts is effected via an intermediate shaft which is in drive connection with the longer output shaft via a pair of gearwheels. Since the two gearwheels of the distributor shafts cannot lie in a common axial plane with the drive gear of the shorter output shaft, which is driven by them, the engagement-related transverse forces are eliminated only in part, so that the shorter output shaft is exposed to a corresponding bending load, which in turn leads to a design-related limitation of the transmittable torque due to the resulting higher load of the tandem bearing. The increase of the transmittable torques, which is possible with such a transmission, in addition involves the disadvantage that the two output shafts are no longer in drive connection at the output end, so that a different torsional behavior of the longer output shaft and the distributor shafts has a disturbing influence, as the extruder screws to be driven change their axial position with respect to each other as a result of a different torsion of the output shafts. This change in axial position leads to different flank clearances of the extruder screws, which has an unfavorable influence on the extrusion process. In the extreme case, the flanks of the extruder screws might even converge, so that the extruder screws are destroyed.

SUMMARY OF THE INVENTION

It is therefore the object underlying the invention to provide a transmission for driving the screws of a twin-screw extruder such that despite the predetermined axial distance of the two output shafts an increase of the total transmittable torque becomes possible without endangering the tandem bearing for the shorter output shaft.

Proceeding from a transmission as described above, this object is solved by the invention in that on the longer output shaft a gearwheel meshing with the drive gear of the shorter output shaft is seated in a manner known per se.

Since as a result of this measure the drive gear of the shorter output shaft is driven via three gearwheels, namely the gearwheel of the longer output shaft and the two gearwheels of the distributor shafts, merely about a third of the torque to be transmitted to the shorter output shaft need be applied via the individual gearwheels, which not only involves a reduction of the load acting on the teeth of the drive gear of the shorter output shaft, but also provides for a substantial elimination of the transverse forces, because the gearwheels meshing with the drive gear of the shorter output shaft can be provided correspondingly distributed over the periphery of the drive gear. This means that as a result of the largely eliminated bending load of the shorter output shaft the tandem bearing for the shorter output shaft may be made comparatively small. Although the longer output shaft is exposed to a torque which corresponds to about two thirds the entire torque to be transmitted to both screw shafts, and must therefore be designed larger than for transmitting the torque required for one screw shaft, a considerable increase in performance can be achieved as compared to the known transmissions for a twinscrew extruder, and with comparable dimensions of the transmission. When the possible increase of the transmittable torque is not utilized, a corresponding prolongation of the useful life can be achieved by the inventive design of the transmission.

When the drive of the shorter output shaft is not effected by means of two, but by means of three distributor shafts, the torque to be transmitted by the longer output shaft on the one hand and by the three distributor shafts on the other hand is reduced to one quarter of the driving torque of the attached screw shaft, which involves a reduction of the torque to be transmitted by the longer output shaft, so that the mounting conditions for the tandem bearing of the shorter output shaft can be improved additionally.

Due to the additional drive connection of the drive gear of the shorter output shaft with the gearwheel of the longer output shaft great advantages are obtained for the uniform angular position of the two output shafts with respect to each other. Since the two output shafts lie in a common parting plane of the transmission casing, the same can be mounted comparatively easily.

BRIEF DESCRIPTION OF THE DRAWINGS

In the drawing, the subject-matter of the invention is represented by way of example, wherein:

FIG. 1 shows an inventive transmission for driving the screws of a twin-screw extruder in a schematic top view, FIG. 2 shows a section along line II—II of FIG. 1, FIG. 3 shows a section along line III—III of FIG. 1, and FIG. 4 shows a section along line IV—IV of FIG. 1.

BEST MODE OF EXECUTING THE INVENTION

The illustrated transmission has two output shafts 1 and 2 for driving the screws of a not represented twin-screw extruder. While the longer output shaft 1 can directly be driven via a shaft stub 3 at the input end of the transmission, the drive of the shorter output shaft 2 is effected via a drive gear 4, which is meshing on the one hand with a gearwheel 5 of the longer output shaft 1 and on the other hand with two gearwheels 6 of two distributor shafts 7, as can be taken in particular from FIG. 2. At their input ends, the distributor shafts 7 each carry a gearwheel 8, which engages in a common drive gear 9 on an intermediate shaft 10. The intermediate shaft 10 is driven by means of the shaft stub 3, namely via a pair of gearwheels 11, as is shown in FIGS. 3 and 4. Driving the two output shafts 1 and 2 via the shaft stub 3 provides the advantage that a reduction gear unit of a conventional design, which is adapted to the respective requirements, can easily be mounted before the transmission. As a result, the oil supplies of the transmission and the preceding reduction gear unit can easily be separated. Due to the different peripheral speeds and side fits of the gearings it may be advantageous to operate the transmission with oil of a higher viscosity and operate the reduction gear unit with oil of a lower viscosity.

The torque transmission to the drive gear 4 of the shorter output shaft 2 via three gearwheels 5 and 6 provides for a largely symmetrical introduction of force into the drive gear 4, so that the effective transverse forces are largely eliminated towards the outside. The related small bending load of the shorter output shaft 2 provides for a larger axial distance of the shaft bearings 12, which can accordingly be disposed axially offset with respect to the shaft bearings 13 of the longer output shaft 1. In addition, when designing the tandem bearing 14 for the shorter output shaft 2, a deflection of said output shaft 2 need not be considered, so that despite the predetermined close distance of the two output shafts 1 and 2, the tandem bearing 14 can be dimensioned sufficiently. Since one sixth of the torque applied onto the shaft stub 3 must each be transmitted to the drive gear 4 of the shorter output shaft 2 via the gearwheels 5 and 6, one third of the torque acting on the shaft stub 3 must be transmitted to the intermediate shaft 10 via the pair of gearwheels 11, from which intermediate shaft the torque transmitted is distributed over the two distributor shafts 7, whereas by means of the shaft stub 3 two thirds of the entire torque must be transmitted via the output shaft 1 to the gearwheel 5, so that upon delivery of one sixth of the entire torque to the drive gear 4 of the shorter output shaft 2, half the driving power is available at the output stub of the longer output shaft 1. This distribution of the torques to be transmitted over the shafts 1 and 7 is effected by means of a precise adjustment of the diameters of these shafts exposed to a torsional load.

As can be taken from the drawing, a comparatively simple assembly of the transmission can be ensured by a horizontal parting plane of the not represented transmission casing through the two output shafts 1 and 2. In this case, the distributor shafts 7 need merely be inserted in the casing in axial direction. The gearwheels seated on the distributor shafts 7, preferably the gearwheels 8, are precisely adjusted in their rotational position via oil interference fits, in order to eliminate flank clearances in the individual gearing stages and coupling connections, which constitutes the prerequisite for a precise torque distribution.

What is claimed is:

1. A transmission for driving the screws of a twin-screw extruder comprising a shorter output shaft, a longer output shaft, the output shafts extending parallel to each other and rotating in opposite directions, and a tandem bearing for the shorter output shaft, which transmission increases the transmittable torque without interfering with the tandem bearing for the shorter output shaft and comprises
   (a) two distributor shafts,
      (1) each distributor shaft carrying a gearwheel,
   (b) a drive gear on the shorter output shaft, the drive gear meshing with the gearwheels,
   (c) a gearwheel on the longer output shaft, said gearwheel meshing with the drive gear,
   (d) an intermediate shaft for driving the distributor shafts,
      (1) the intermediate shaft carrying a gearwheel meshing with an additional gearwheel on the longer output shaft.

2. The transmission of claim 1, comprising a further distributor shaft for driving the drive gear on the shorter output shaft.

3. The transmission of claim 1, wherein the output shafts are disposed in a common parting plane of a transmission casing.

\* \* \* \* \*